United States Patent [19]
Scully

[11] 3,983,682
[45] Oct. 5, 1976

[54] APPARATUS FOR FORMING, FILLING AND INSERTING FILLED BAGS INTO CARTONS

[75] Inventor: John W. Scully, Raynahm, Mass.

[73] Assignee: Pneumatic Scale Corporation, Quincy, Mass.

[22] Filed: Nov. 27, 1974

[21] Appl. No.: 527,808

[52] U.S. Cl. .................................. 53/126; 53/170; 53/179; 53/182 M; 53/373; 53/383
[51] Int. Cl.² .................. B65B 1/02; B65B 9/02; B65B 51/14; B65B 61/24
[58] Field of Search ............ 53/180 M, 182 M, 170, 53/173, 175, 179, 260, 261, 124 E, 124 CC, 126, 383, 27, 28, 373, 374

[56] References Cited
UNITED STATES PATENTS

| | | | |
|---|---|---|---|
| 1,376,499 | 5/1921 | Anderson | 53/175 |
| 2,156,561 | 5/1939 | Cordrey et al. | 53/173 X |
| 2,214,944 | 9/1940 | Vogt | 53/27 X |
| 2,950,588 | 8/1960 | Gausman | 53/182 M |
| 3,314,210 | 4/1967 | Jarund | 53/175 X |
| 3,318,067 | 5/1967 | Grafingholt | 53/180 M |
| 3,334,466 | 8/1967 | Scholle | 53/28 |
| 3,456,861 | 7/1969 | Wettlen | 53/28 X |
| 3,826,061 | 7/1974 | Hunter | 53/182 M |
| 3,842,569 | 10/1974 | McCelland et al. | 53/126 X |

FOREIGN PATENTS OR APPLICATIONS

| | | | |
|---|---|---|---|
| 1,348,832 | 12/1963 | France | 53/180 M |

*Primary Examiner*—Robert L. Spruill
*Attorney, Agent, or Firm*—Robert T. Gammons

[57] ABSTRACT

A method of packaging particulate material in a carton within a flexible bag comprising forming a tube of flexible material, sealing a narrow length of the tube transversely to provide a bag length above the seal closed at the bottom and open at the top and a bag length below the seal closed at the bottom and top, and severing the tube at the seal to separate the bag below the seal from the bag above the seal and while sealing and severing the tube to form the bags, filling the bag length above the seal to a predetermined level. The bag length below the seal is gravitationally dropped into the open top of the carton and while dropping its side walls are confined so as to have a cross section corresponding to the inside cross section of the carton.

14 Claims, 14 Drawing Figures

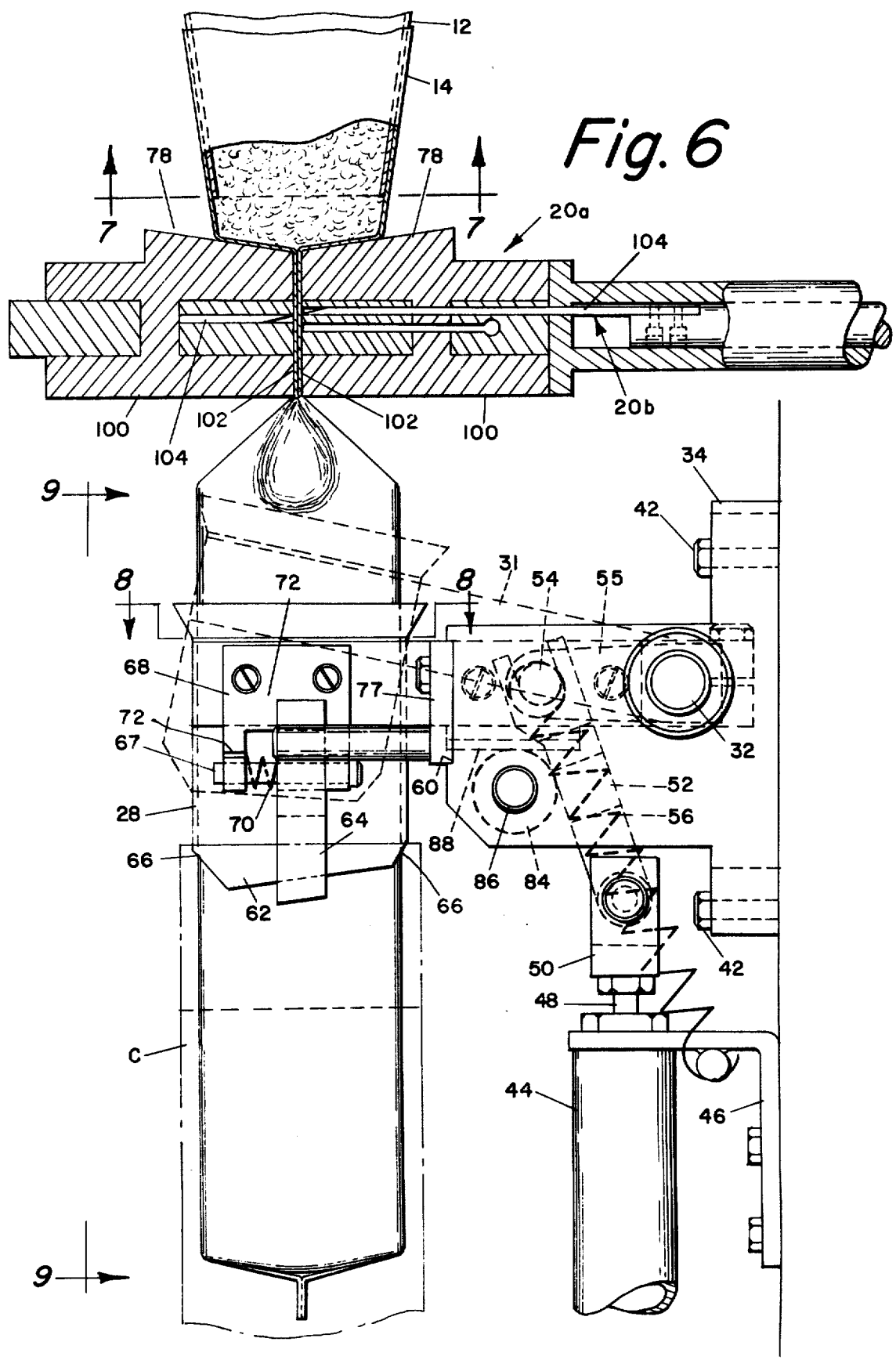

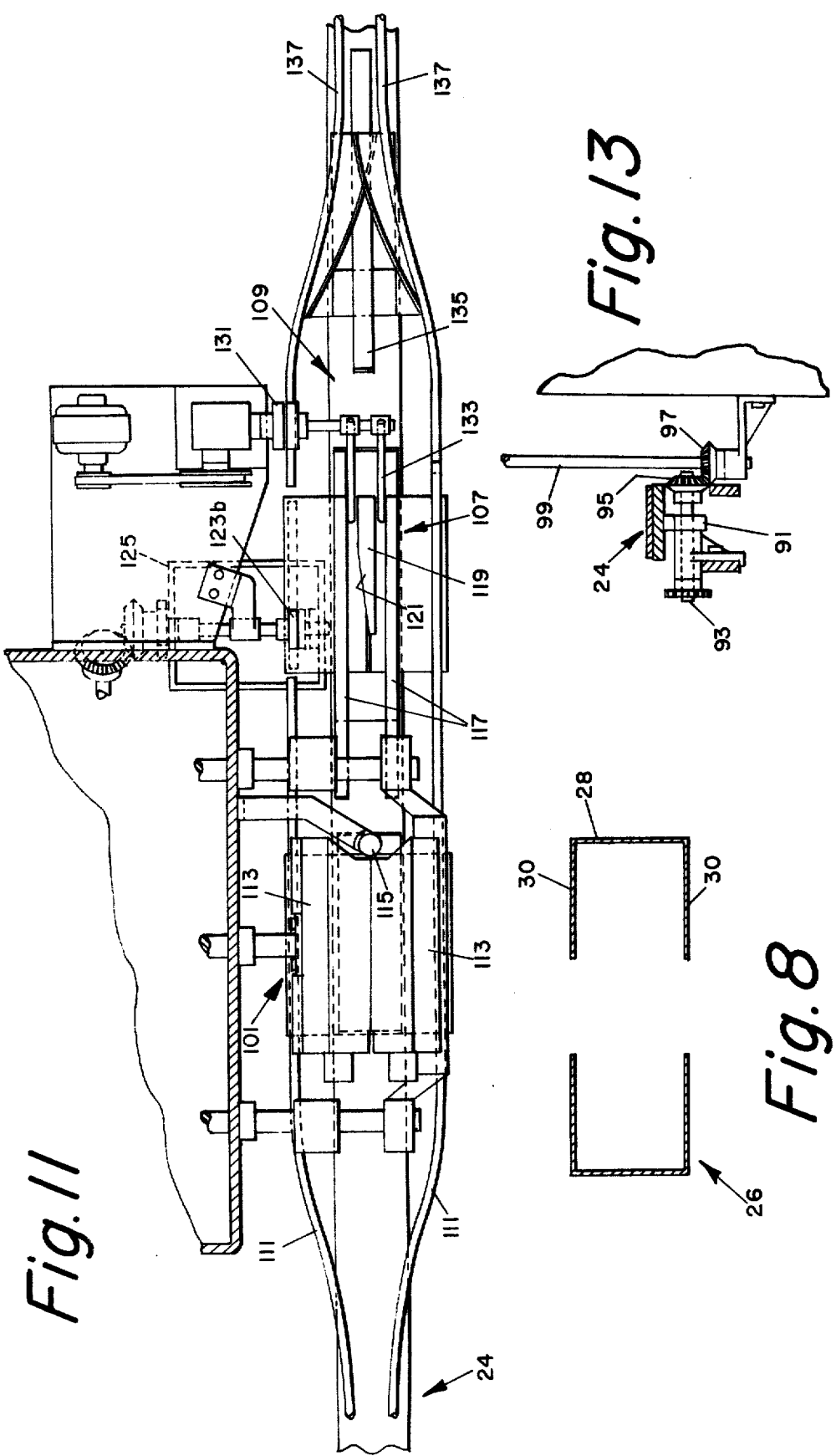

APPARATUS FOR FORMING, FILLING AND INSERTING FILLED BAGS INTO CARTONS

BACKGROUND OF INVENTION

There are numerous patented bag forming and filling machines of the kind with which this invention is concerned constructed to form continuous flexible sheet material into a tube, seal the tube transversely to form an open bag above the seal for receiving the particulate material to be packaged and a closed bag below the seal already filled with material. The tube is severed simultaneously with the sealing at the seal so that a portion of the seal forms the closed bottom of the bag above the seal and a portion of the seal forms the top of the bag below the seal. The severed bag below the seal is dropped into a receiver and if it is to be cartoned delivered from the receiver to a place of cartoning. Such apparatus is disclosed in U.S. Pat. No. 2,154,521 and No. 3,774,509. There are several problems involved in cartoning bags filled as related above which arise from the fact that the machine is vertical rather than horizontal and particular to the characteristics of particulate material, to wit, its lack of shape, its weight and its bulk or lack of bulk. In a vertical machine such as is concerned the material is gravitationally deposited through the tube into the formed bag and because of its particulate nature tends to expand the lower end of the bag so that the bag is pear shaped and this makes it difficult to introduce it into a carton of a predetermined size. Also, if the material is heavy it tends to burst the seal at the bottom of the bag while the latter is still weak and if the material is light and bulky it fills the bag length to a greater height than the height of the carton so that the only alternative is to use a larger carton and this is uneconomical and also objectionable to the customer. It is the purpose of this invention to provide a method of packaging on a vertical machine of the kind referred to which will in a large part eliminate the problems heretofore experienced.

SUMMARY OF INVENTION

The method packaging particulate material in a carton within a flexible bag, comprising forming a continuous length of flexible tubing, sealing the tube transversely to form a bag length above the seal, filling the bag length above the seal to a predetermined level, guiding the filled bag length toward an open top carton supported therebelow and simultaneously confining the sides of the bag to the cross section of the carton as the bag is guided into the carton. The bag may be vibrated as it is guided into the carton to cause it to conform precisely to the cross section of the carton and to cause a bulky material to have a predetermined height not exceeding the height of the carton or it may be vibrated after it is deposited in the carton for the same purposes. The tube is formed to the cross section of the carton before it is filled and the material is delivered through the tube to the bag length above the seal while the seal is being formed. The method includes heat sealing the tube, clampingly holding the seam formed thereby and supporting portions of the bottom of the bag at each side of the seam while the bag is being filled. The separation of a filled bag from the succeeding bag to be filled is carried out simultaneously with the filling, either by severing the bag at the seal so that a part of the seal forms the top of the bag below the seal and a part the bottom of the bag above the seal or below the seal so that the filled bag is open at the top. In either instance the bag is gravitationally dropped into the carton and if not already sealed the top is then sealed. The method includes folding the closure flaps of the carton after the bag is deposited therein.

The apparatus for carrying out the aforesaid method comprises a vertical tube forming and filling machine equipped with a hollow forming mandrel, means for feeding the formed tube downwardly on the mandrel and sealing and severing means for forming the tube into bags. In accordance with this invention the lower part of the mandrel is constructed to have a cross section corresponding substantially to the interior cross section of the carton within which the bag is to be inserted and there is means mounted below the sealing and severing means having a cross section corresponding substantially to the lower end of the mandrel for accepting the bag and guiding it downwardly into a carton supported therebelow. The guiding means comprises opposed channel members supported at opposite sides of the downwardly moving bag with their upper ends close to the lower side of the sealing and severing means and their lower ends close to the upper end of the carton. There is means for raising and lowering the channel members to permit a carton to be moved to a position below them, means at the lower ends of the channels which enter the cartons at the sides and ends to hold the closure members erect and means for vibrating the channels. The sealing and severing means comprise in one form gripping jaws arranged to move toward and from each other in a horizontal plane to form a seal transversely thereto and are heated. The severing means comprise cutting blades arranged to be moved in a horizontal plane intermediate the tops and bottoms of the gripping jaws to cut through the seal. Optionally, the faces of the gripping jaws below said plane may be omitted so that the severing means cuts through the tube below the seal. According to the invention the upper side of the gripping jaws are provided with relatively broad flat surfaces on which the lower part of the bag is adapted to rest while the bag is being filled and there is means for maintaining the sealing jaws engaged with the seal throughout the filling operation. A conveyor provides for moving cartons to a position below the mandrel for gravitationally receiving the filled bags and there is means beyond the mandrel in the direction of movement of the conveyor for sealing the bags in the cartons if not already sealed, applying adhesive to one of the closure flaps and folding the closure flaps into sealing engagement.

The invention will now be described in greater detail with reference to the accompanying drawings, wherein:

FIG. 6 is a view similar in part to FIG. 5, showing the bottom of the bag flattened and supported by the upwardly facing surfaces of the sealing jaws and the showing in elevation of the guiding means for introducing the bag into the carton;

FIG. 8 is a horizontal section taken on the line 8—8 of FIG. 6;

FIG. 11 is a plan view taken on the line 11—11 of FIG. 12;

FIG. 13 is a fragmentary view taken on the line 13—13 of FIG. 12.

Figure 1:
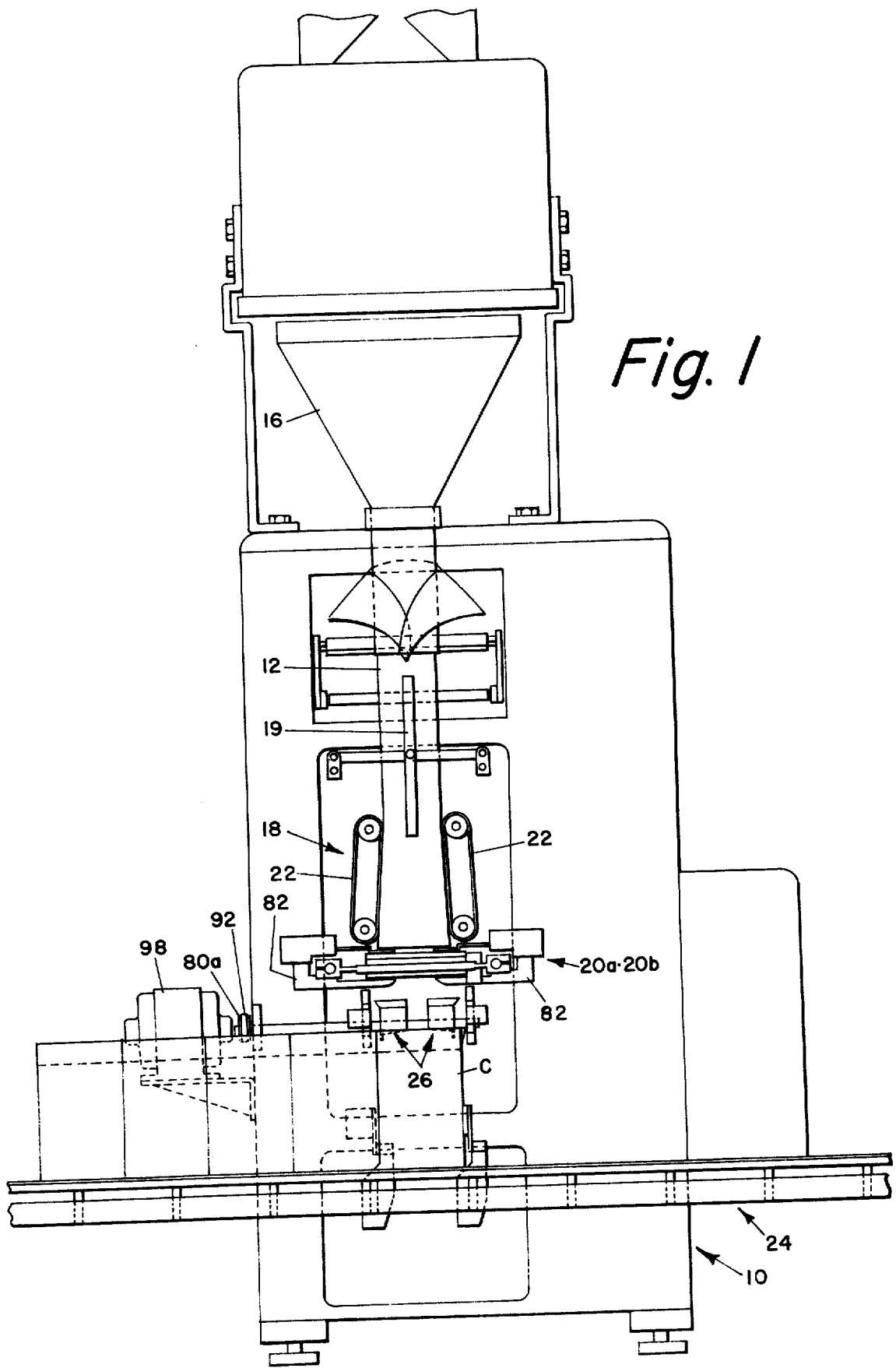
FIG. 1 is a front elevation of a vertical forming and filling machine according to this invention.
Figure 2:
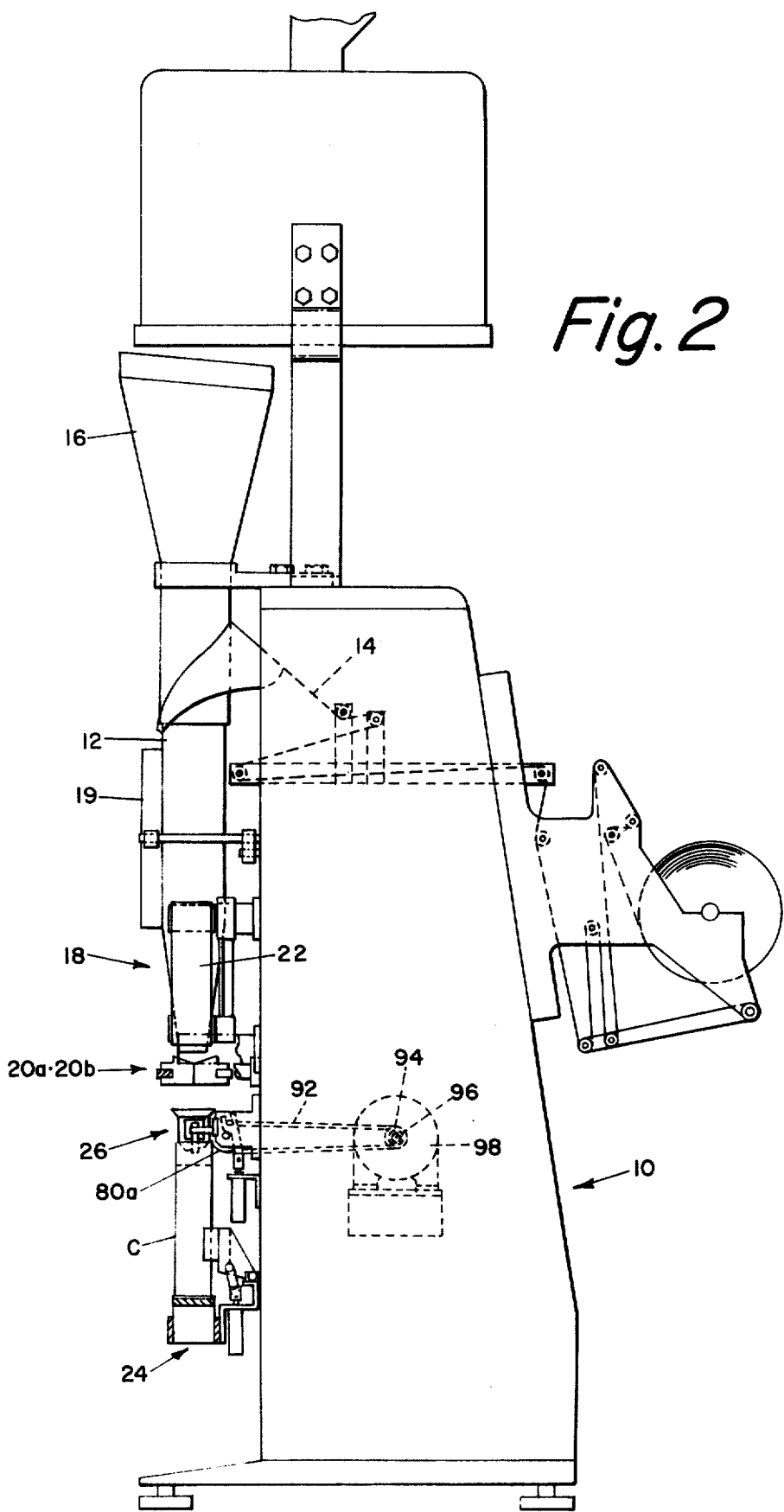
FIG. 2 is a side elevation as seen from the right side of FIG. 1.

Referring to the drawings, FIGS. 1 and 2, the apparatus of this invention is a vertical type forming and filling machine comprising a base frame 10 on which there is supported vertically a hollow forming and filling mandrel 12 to which there is supplied flexible sheet material 14 for forming into a continuous tube on the mandrel and above which there is supported a hopper 16 for supplying the material to be packaged. At the lower end of the mandrel there is means 18 for moving the formed tube downwardly thereon and sealing and severing means 20a, 20b for forming the tube into bag lengths and separating the lengths into separate bags. A side seam sealing element 19 is mounted axially of the mandrel for continuously forming a side seam. All of this structure is conventional and shown in one or more of the patents referred to above.

It is customary after forming and filling the bags on a machine of this type to drop them on to a receiver and to deliver them from the receiver by a conveyor or the like to a place of cartoning if the bags are to be placed within cartons.

Figure 3:
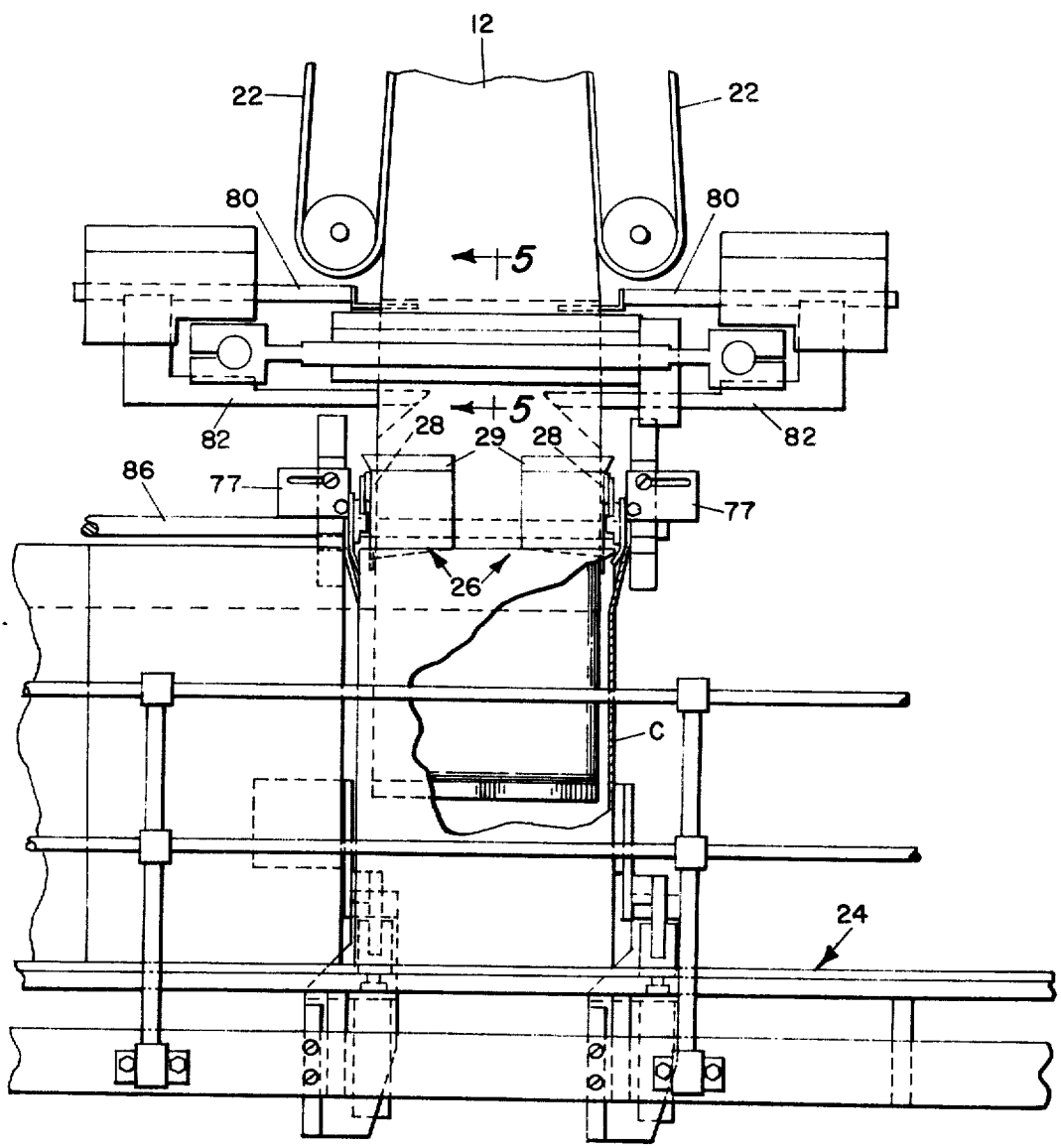
FIG. 3 is an enlarged fragmentary front elevation of the machine showing the means for guiding the filled bags into the cartons.
Figure 4:
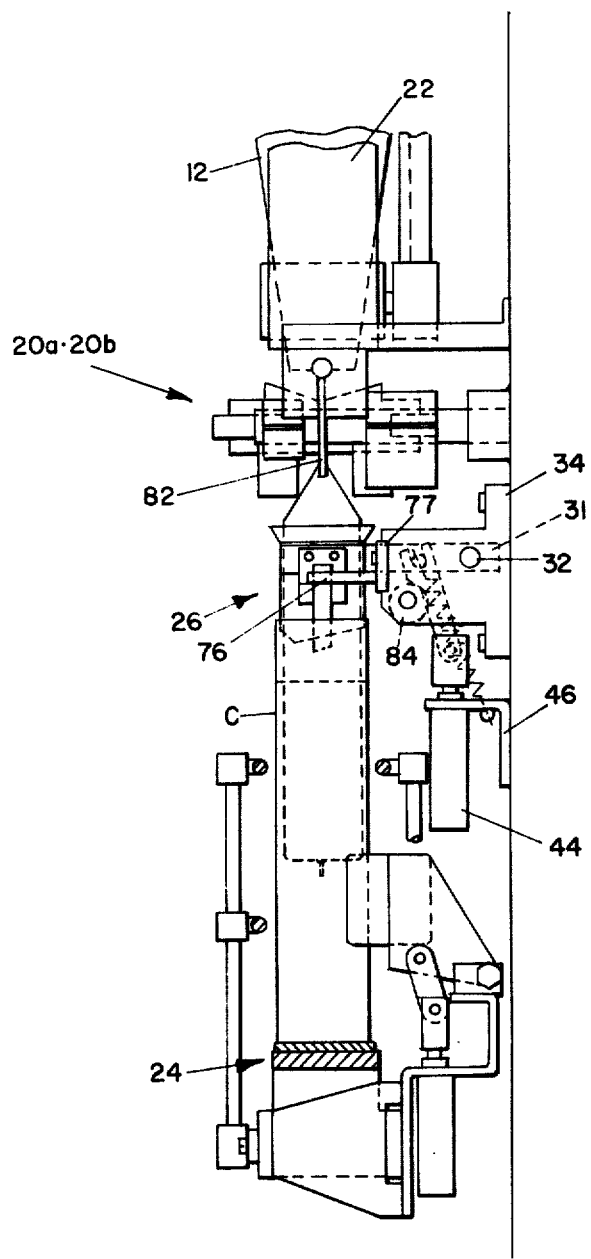
FIG. 4 is a side view of FIG. 3 as seen from the right side thereof.
Figures 6A, 7:
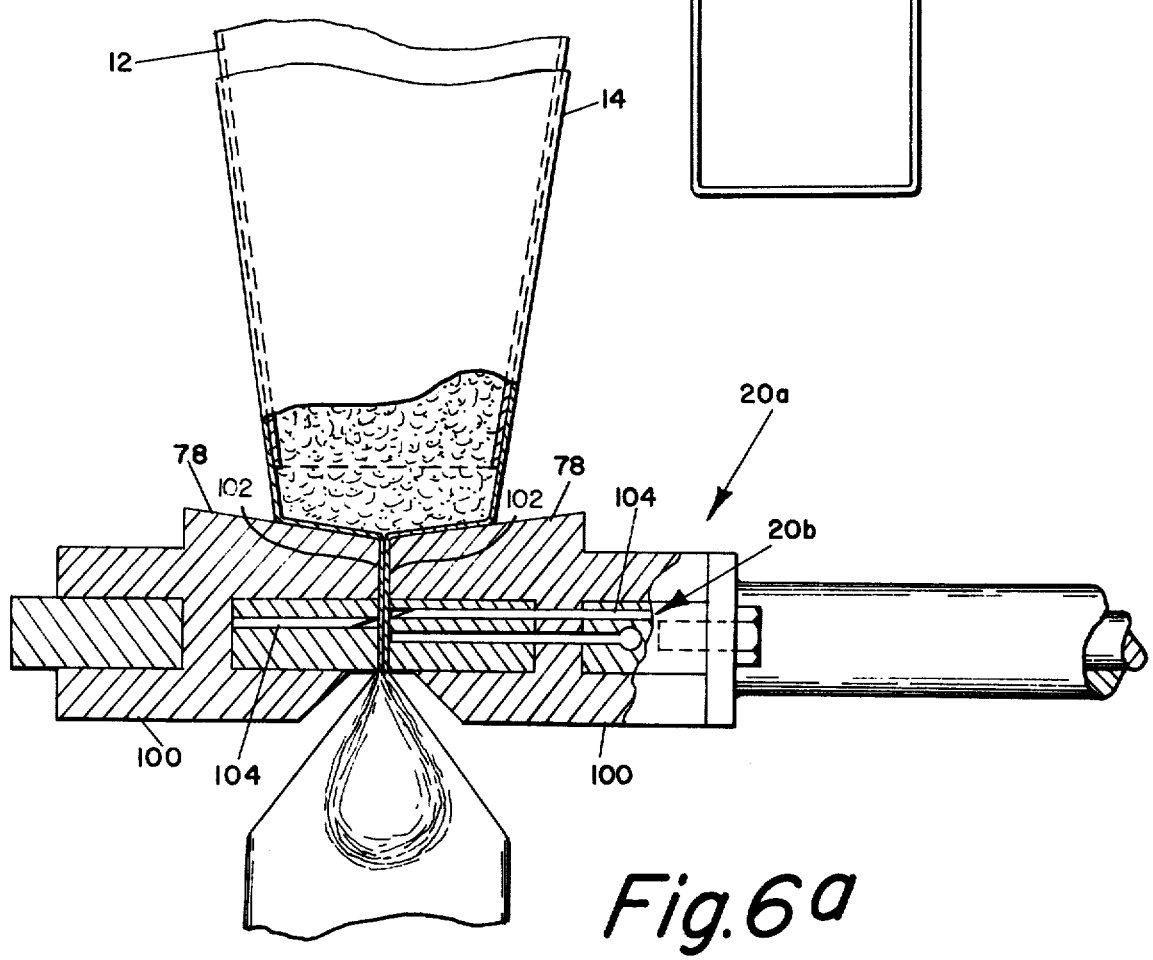
FIG. 6A is a section similar to FIG. 5 showing the sealing jaws cut away below the cutting blades.
FIG. 7 is a view taken on the line 7—7 of FIGS. 5 and 6.

Due to the fact that the particulate material tends to settle at the bottoms of the bags and the bags are not shape retaining it becomes difficult to insert them into the cartons within which they are to be packaged. In one instance, as shown in U.S. Pat. No. 3,314,210 this difficulty was sought to be overcome by only partially filling the bag as it was formed, dropping it directly into a carton supported below the forming and filling tube and thereafter completing the filling operation. According to this invention the filling is completed and the filled bags inserted into the cartons in one operation. To achieve this the hollow mandrel 12 is formed at its lower end as shown in FIGS. 1, 3 and 7 to have a cross section corresponding substantially to the inside cross section of the carton within which the bag is to be packaged. Since this carton is of rectangular cross section the lower end of the mandrel is correspondingly rectangular in cross section. As this formed, the sheet material delivered from the lower end of the mandrel has a cross section corresponding substantially to the inside of the carton. If it should be desirable to employ a carton of other than rectangular cross section the lower end of the mandrel will be made of corresponding cross section so as to form the tube as it leaves the lower end of the mandrel to the cross section of the carton. Delivery of the shaped side seamed tubular material from the lower end of the mandrel is effected by means of driven belts 22—22, FIG. 3, supported at opposite sides of the mandrel.

The cartons C into which the filled bags are to be inserted are supported below the mandrel on conveyor means 24, FIGS. 3, 11 and 12, which delivers the cartons one at a time below the mandrel in timed relation with the filling operation and in accordance with this invention in order to guide the filled bags smoothly into the open tops of the cartons there is provided guide means comprising a pair of opposed channel members 26—26, FIGS. 3, 6, and 8, which are supported below the sealing and severing means and above the open tops of the cartons resting on the conveyor 24 therebelow. Each channel member 26 has a side wall 28 and right angularly disposed front and back walls 30—30 for engagement with the sides of the formed bags and the front and back walls. In conjunction, as shown in FIG. 8, they provide an opening corresponding substantially in cross section to the lower end of the mandrel so as to receive a filled bag as the later is lowered toward the open top of the carton for guiding it into the open top of the carton and for simultaneously preventing the side walls from bulging, in other words, preserving the cross sectional shape of the bag as it is delivered from the mandrel. The upper ends of the channels are provided with the flaring lips 29, FIGS. 3 and 6, to insure admission of the bags.

The guide means comprising the channels 26—26 are supported for movement up and down relative to the conveyor 24 and there is provided means for movement therewith to enter the open top of the carton to hold the end and side closure flaps erect. To provide for such movement the channels are mounted between the forward ends of a pair of transversely spaced arms 31—31, FIGS. 6 and 10, fixed at their rear ends on a horizontal shaft 32, the latter being mounted at its opposite ends on bracket members 34—34. The bracket members, FIG. 9, contain vertical slots 38—38 for receiving attaching bolts 42 by means of which the height of the guiding means may be adjusted. A pneumatic cylinder 44 is mounted on a bracket 46 below the guiding means from which projects upwardly a rod 48 and this is pivotally connected by a yoke 50 to an arm 52, the upper end of which is forked for receiving the ends of a shaft 54 fixed to the forward end of an arm 55. The rear end of the arm 55 is fixed to the shaft 32. Coiled springs 56—56 connected at one end to the shaft 54 and at their opposite ends to a rod 58 secured to the bracket 46 operate to normally pull the arm 55 downwardly to a horizontal position as shown in FIG. 8. Pressure supplied to the cylinder 44 will move the arm 55 upwardly to in turn move the channel members upwardly to clear the upper ends of cartons being moved into position below them.

The means for holding the end and the side closure flaps erect comprise downwardly extending parts 62—62 and 64—64. The parts 62—62 comprise vertical extensions of the end walls 28—28 and have beveled corner portions 66—66 so that as the channels are moved downwardly the beveled portions enter between the front and back closure flaps and cam them apart. The parts 64—64 are relatively narrow plates pivotally supported on horizontally disposed spindles 67—67, the latter being fixed to bracket plates 68—68 bolted to end walls 28—28 of the channel members. Springs 70—70 on the spindles anchored at one end 72 to the bracket plates 68—68 and at their other ends to the parts 64—64 bias the plates inwardly toward each other as illustrated in dotted lines in FIG. 9 when the channel members are raised to their upper positions.

Figure 9:
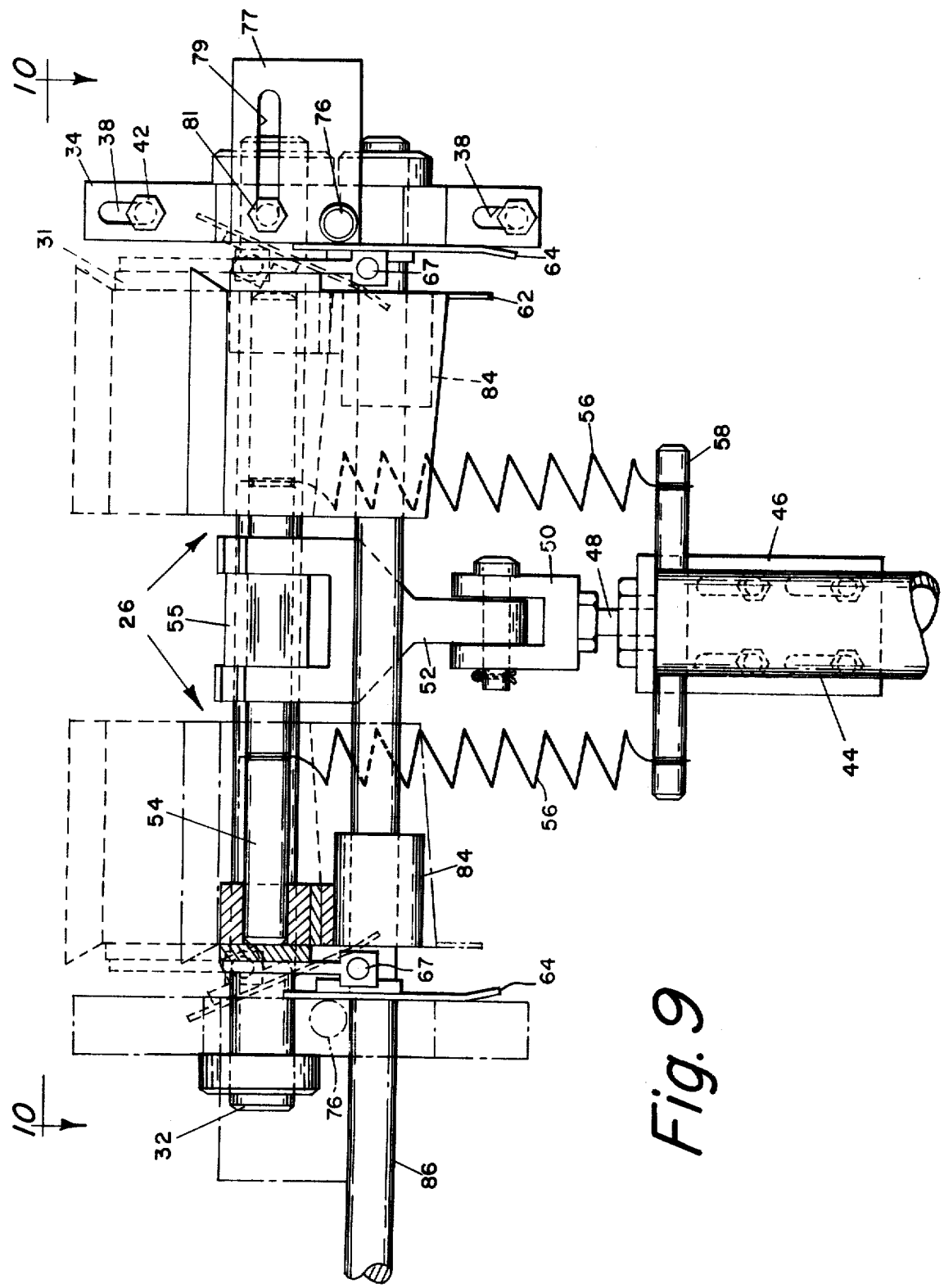
FIG. 9 is a front elevation taken on the line 9—9 of FIG. 6.

As the channel members are lowered the upper ends of these parts are engaged by abutments 76—76 fixed to angle members 77—77 and caused to be displaced outwardly to the full line positions shown in FIG. 9 to force the end closure flaps outwardly to vertical positions. The angle members contain slots 79—79 for receiving bolts 81—81 by means of which they are adjustably mounted to the brackets 34—34.

Figure 5:
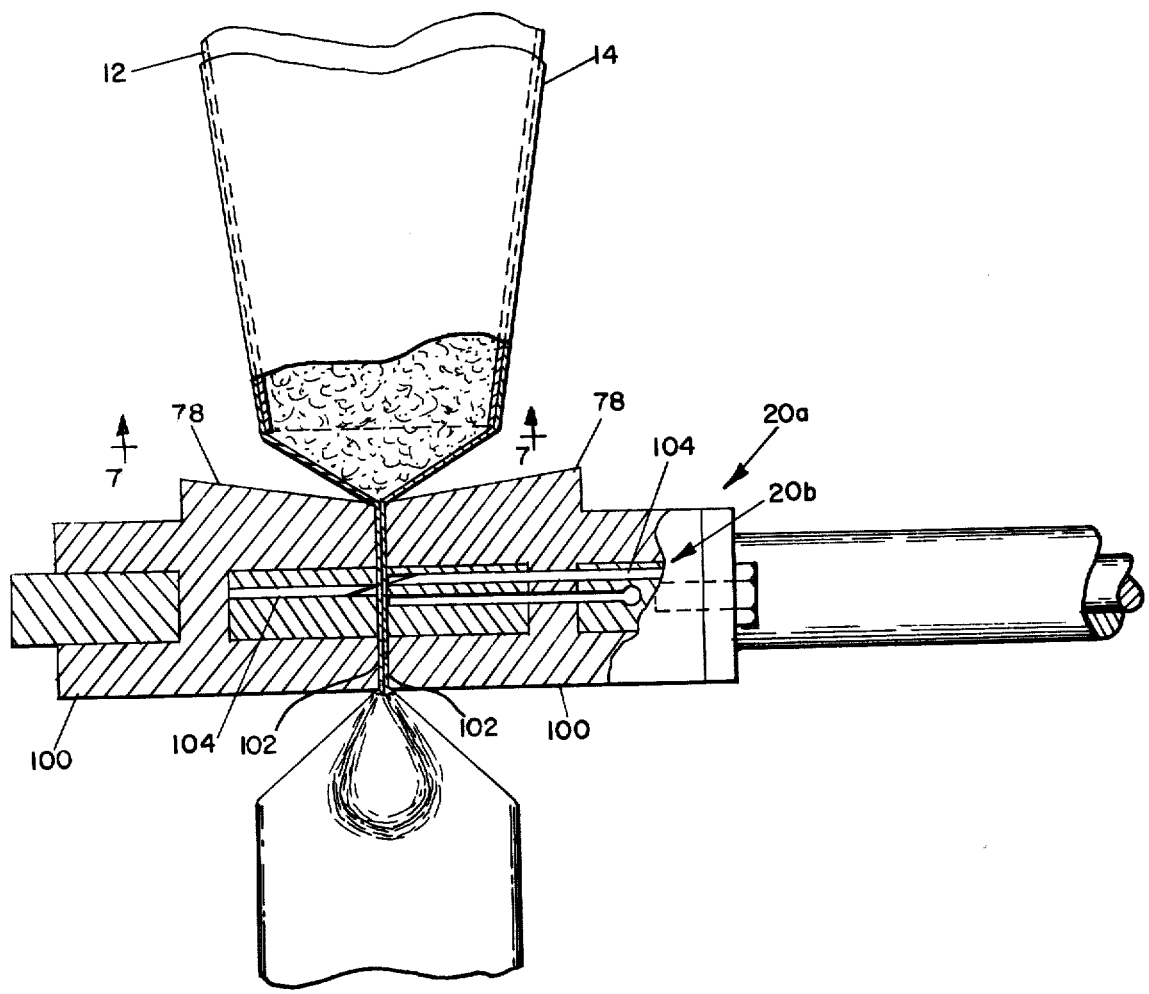
FIG. 5 is a partial elevation from the right side of the apparatus as shown in FIG. 1, showing the sealing and severing means in section and the bottom of a bag before it is flattened by the weight of the material being deposited therein.

The sealing means 20a in one form, as illustrated herein, FIGS. 5 and 6, comprises a pair of opposed jaws 100—100 supported for horizontal reciprocation toward and from each other which have vertically disposed flat faces 102—102 for engagement with the front and back sides of the tube to press them together to seal a narrow length of the tube as shown in FIG. 5, extending from top to bottom of the faces of the jaws. For the purpose of sealing, the jaws are heated although it should be understood that it is within the scope of the invention to employ self-sealing material which when pressed together will form a permanent seal. The jaws have a vertical depth which is sufficient to form a sealed area which is adapted to be severed intermediate its upper and lower boundaries to form a seal at the lower end of the bag above the jaws and a seal at the upper end of the bag below the jaws.

The severing means 20b comprises cutting blades 104—104 which are recessed into the jawss 100—100 for horizontal movement, after the jaws are brought together, to cut through the sealed area. When a structure of this kind is employed, as soon as the jaws are retracted, the bag at the lower side of the jaws is released whereupon it gravitationally descends through the guiding means and into the carton.

It may be desirable under certain circumstances to leave the top of the bag below the jaws open until it is deposited in the carton and if this is the case the lower portions of the jaws 100—100 below the cutting blades 104—104 are beveled as shown in FIG. 6a so that the seal takes place only above the cutting blades. The tube below the cutting blades is not sealed and so the bag length formed by severing the tube remains open at the top and will drop downwardly through the guiding means into the carton. When operating in this fashion there is provided means 101 as shown in FIGS. 11 and 12 for sealing the upper open ends of the bags while within the cartons after the latter are moved away from the lower end of the mandrel by the conveyor 24.

A problem which has been troublesome with prior forming and filling apparatus of this kind has been that the weight of the material deposited in the bags, particularly if the material is relatively heavy, bursts the bottom seam of the bag before the seam becomes firm and so in accordance with this invention the sealing jaws 100—100 are provided at their upper sides, FIGS. 5 and 6, with flat supporting surfaces 78—78 upon which the lower end of the bag at each side of the seam is adapted to rest during the filling operation. FIG. 5 shows the shape of the lower end of the bag before it is filled and also the shape it would have if the material was very light weight. A heavy material will depress the bottom into engagement with the surfaces 78—78. The operation of the apparatus is designed to hold the sealing jaws 100—100 engaged with the bottom seam until the bag is completely filled and for a sufficient length of time to perfect the seal by allowing it to become set before the sealing jaws are retracted to permit the bag to be dropped down for deposit into the carton therebelow. An additional advantage is achieved by this means in that the supporting surfaces 78—78 contribute to forming a bag the entire length of which is substantially of uniform cross section. This provides for a maximum fill volume and minimum bag length even when the bottom seal is of the pillow slip type. It is, of course, within the scope of the invention to have a gusset type bottom and for this purpose there are provided tucking members 80—80, FIG. 3, of conventional construction which are arranged to move horizontally inwardly over the top of the sealing jaws and below the lower end of the forming mandrel. If a pillow slip type of seal is to be made the tucking members are withheld from operation. There are also tucking members 82—82 below the sealing and severing means which are correspondingly moved inwardly with the upper tucking members to form tucks at the upper ends of the bags if desired.

Figure 10:
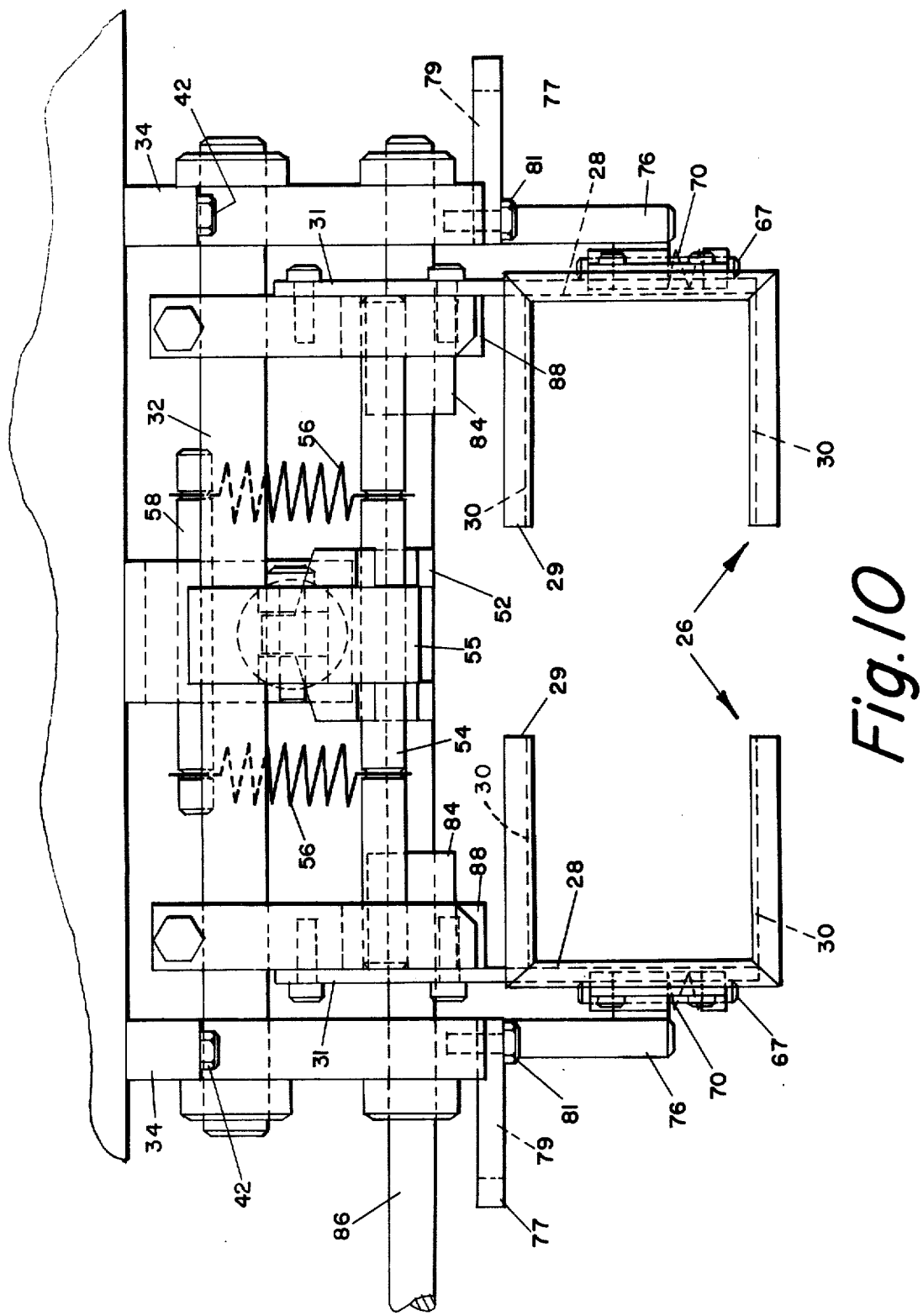
FIG. 10 is a plan view taken on the line 10—10 of FIG. 9.

As previously related, the guiding means comprising the channel members 26—26 are arranged to maintain the cross section of the bag as it descends from the mandrel toward the top of the carton in substantially the configuration and cross section of the carton. It is sometimes found advantageous to insure symmetry of the cross section of the package and uniformity of distribution of the material in the bag from top to bottom to vibrate the bag either while it is being guided downwardly into the carton or after is is deposited in the carton. For the purpose of vibrating the bag while it is being guided downwardly into the carton there is provided, as shown in FIGS. 6, 9 and 10, eccentrics 84—84 fixed to a horizontal shaft 86. The eccentrics 84—84 bear against hardened plates 88—88 secured to the undersides of the arms 31—31 so that rotation of the eccentrics rapidly raises and lowers the arms a very slight amount. The shaft 86 is rotated by means of a pulley 80a, FIG. 2, fastened to it about which is entrained one end of a belt 92. The opposite end of the belt 92 is entrained about a pulley 94 on the drive shaft 96 of a motor 98.

Figure 12:
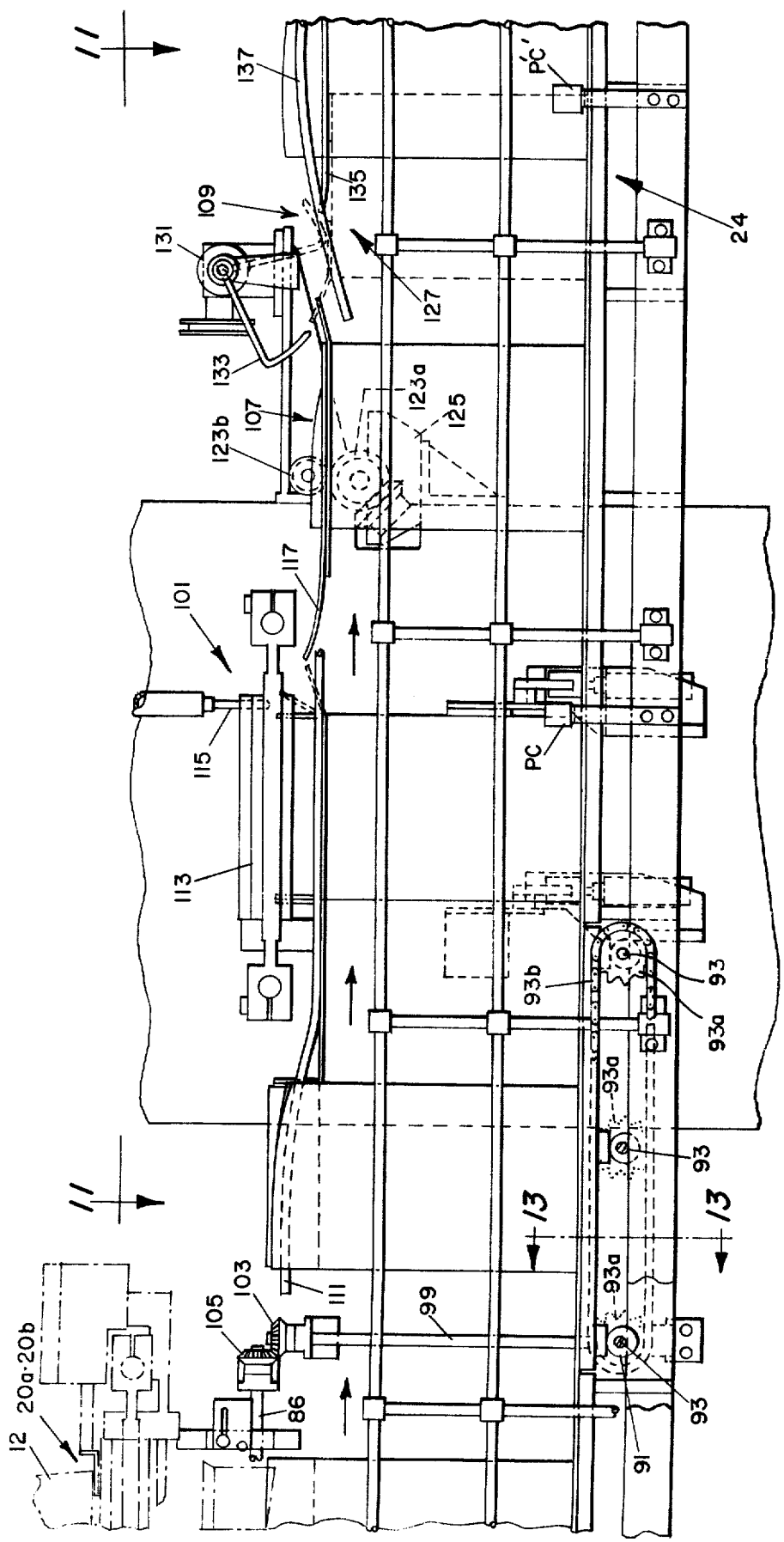
FIG. 12 is an elevation of FIG. 11.

Instead of effecting vibration of the channel members as thus described, it is within the scope of the invention to effect vibration of the cartons while resting on the conveyor 24 by means of eccentrics 91 supported in engagement with the underside of the conveyor 24, FIGS. 12 and 13. The eccentrics 91 are fixed to shafts 93 to which are fixed sprockets 93a about which are entrained a chain 93b. One of the shafts, 93 is connected by beveled gears 95, 97, a shaft 99 and beveled gears 103 and 105 to the shaft 86.

In accordance with the method of operation of this apparatus when packaging lightweight bulky material which does not settle very well into the bag during the bag filling operation the bag is filled to a higher level than the depth of the carton, the over-filled bag is severed from the succeeding bag and vibrated either by the guide means or when deposited in the carton resting on the conveyor as related above to cause the bulky material to settle sufficiently so that the vertical height of the bag does not exceed that of the carton. When practicing the method as thus described the sealing of the open top of the bag is accomplished in the carton as shown in FIGS. 11 and 12 by the sealing means 101.

When the bags are left open at the top until deposited into the carton there is provided as heretofore mentioned, sealing means 101 for sealing the open ends, means 107 for folding the sealed ends into the carton and means for closing the end and side closure flaps of the carton, FIGS. 11 and 12. Referring to FIGS. 11 and 12, as a carton with a bag in it is moved by the conveyor 24 away from the lower end of the forming and filling apparatus to the right as shown in FIG. 12, the front and back closure flaps are spread apart by spaced parallel folding rails 111—111. The sealing means 101 comprise jaws 113—113 similar to those disclosed in FIGS. 5 and 6 arranged to reciprocate in a horizontal plane above the top line of the containers moving along on the conveyor. The open tops of the bags will be moved between the separated jaws and at the right time a detector in the form of a photo cell PC causes the jaws to be closed on the upwardly projecting top of the bag to seal the top. As the jaws come together they push the end wall closure flaps apart and to hold the leading closure flap displaced downwardly, when the jaws are retracted, there is provided a pneumatic plunger 115 which is depressed into engagement with the leading flap, as shown in FIG. 12, to a nearly horizontal position so that as the carton continues to be moved along the leading closure flap it will be engaged with the underside of spaced rails 117—117 and be held down. A folding blade 119 having an inclined edge 121, supported above the line of travel of the upper ends of the carton provides for folding the upwardly projecting sealed top of the bag over so as to lie flat within the open top of the carton. Simultaneously adhesive is applied to the lower side of the closure flap at the back of the carton by means comprising a pair of rollers 123a, 123b and a pot 125 which supplies adhesive to the lower one of the rolls 123a. Beyond the folding adhesive applying means there is means 127 for engaging the underside of the leading flap to cause it to be folded back and down over the top of the carton. At this point the forward end of the carton intercepts another photo cell P′C′ and a one revolution clutch 131 actuated by a solenoid moves a hook 133 under the trailing closure flap and folds it forwardly and down over the open top of the carton so that both the leading flap and the trailing flap now move under a rail 135. Further movement of the carton brings the front and back closure flaps into engagement with spaced folding rails 137—137 which operate to first fold the adhesive coated back closure flap inwardly over the end flaps and then the front closure flap onto the upper adhesive coated side of the back closure flap.

As thus related, the method and apparatus described above provides for packaging particulate material in such a way as to make use of the maximum capacity of the bag with minimum dimensions and to introduce the bag into the carton easily with a close fit all around, that is, transversely and from top to bottom which will afford the appearance of a completely filled carton which is highly desirable to insure complete customer acceptance.

During a single cycle of operation a bag is formed above the sealing jaws, closed at its lower end and open at its upper end, and a bag is formed below the sealing jaws which is closed at its lower end and may be closed or open at its upper end. The filling operation takes place while the sealing jaws are closed and the severing takes place after the sealing operation. Following filling the sealing jaws and severing blades are retracted, the released bag allowed to drop into the carton therebelow and the filled bag lowered for sealing and severing of the succeeding bag. Vibration of the bag is effected while the bag is traveling downwardly from the sealing jaws. If the top of the bag is left open then the top is sealed while in the carton as the latter is moving away from the mandrel and the closure flaps are folded over the tops of the cartons. These operations are timed to provide repeated cycles so long as the operation is to be carried on by kinematic means controlled by limit switches or pre-punched tapes.

It should be understood that the present disclosure is for the purpose of illustration only and includes all modifications or improvements which fall within the scope of the appended claims.

I claim:

1. Apparatus for forming, filling and inserting filled bags into containers, comprising a hollow vertically disposed forming mandrel, means for forming sheet material into a tube on the mandrel and moving it downwardly thereon over the end, said mandrel having at its lower end a cross section which corresponds substantially to that of the inside cross section of the carton into which the bag is to be inserted, means for at times forming seals transversely of the tube to form a bag length above the seal and a bag length below the seal, mean for maintaining the sealing means in sealing relation to the tube for a predetermined time sufficient to effect consummation of the seal, means for supplying material through the mandrel to completely fill the bag length above the seal during said predetermined time, said mandrel serving to confine the bag to the cross section of the carton during filling, means for moving the carton support to position a carton below the sealing means in alignment with the mandrel and means for supporting the lower end of the bag above the sealing means at each side of the seal while the sealing means remains in sealing engagement with the bag and during filling of the bag.

2. Apparatus for forming, filling and inserting filled bags into cartons, comprising a hollow vertically disposed forming mandrel on which sheet material is formed into a continuous tube, said forming mandrel having a lower end corresponding in cross section to the inside cross section of the carton within which the bag is to be deposited, a support below the mandrel for supporting a carton standing upright thereon, sealing means located between the lower end of the mandrel and the carton support operable at times to seal the tube transversely to form a bag length above the seal, means for supplying material through the mandrel into the bag length to completely fill the same while the sealing means remains in seal forming relation, said mandrel serving to confine the bag to the cross section of the container during filling, means below the sealing means defining a vertical passage extending from the lower side of the sealing means down to the open top of the carton therebelow thru which the filled bag is adapted to descend into the open top of the carton, said means constraining the bag to the cross section of the carton throughout the downward movement of the bag, means for lowering the filled bag thru said last named means into the open top of the carton to a position such that the lower end of the bag enters the open top of the carton while still confined within said means and before it is severed from the succeeding tube and means for severing the suspended bag from the succeeding tube so that it drops gravitationally thru said means to the bottom of the carton.

3. Apparatus for forming, filling and inserting filled bags into cartons, comprising a hollow vertically disposed forming mandrel, means for forming sheet material into a tube on the mandrel and moving it downwardly thereon in tubular form from the lower end of the mandrel, means for moving empty carton to a position below the mandrel and from thence away from the lower end of the mandrel, means for at times sealing the tube transversely to form a bag length extending from the mandrel down to the sealing means adapted to be filled through the mandrel, means for completely filling the bag, said mandrel corresponding in cross section to the cartons and serving to confine the bag to the cross section of the cartons during filling, means for releasing the filled bag and moving it downwardly toward the carton support, and means situated below the sealing means for constraining the sides of the filled bag to a cross section of the carton as it moves downwardly into the open top of the carton, said means extending substantially continuously from the sealing means onto the open top of the carton so that the filled bag is constrained to the cross section of the carton throughout its movement from the lower end of the mandrel into the open end of the carton.

4. Apparatus according to claim 3, comprising means for effecting vibration of the means for constraining the bags during movement into the carton.

5. Apparatus according to claim 3, comprising means on the carton support for effecting vibration of the carton following deposit of the bag therein.

6. Apparatus according to claim 3, comprising means for severing the filled bag from the succeeding bag, and means supported above the carton support at the level of the tops of the cartons and in the direction of movement of the carton support for sealing the tops of the bags while in the cartons.

7. Apparatus according to claim 3, comprising means for severing the filled bag from the succeeding bag while the latter is being filled, means at the far side of the mandrel with respect to the movement of the container support relative thereto for folding the closure flaps outwardly, sealing the top of the bag in the carton and then folding the closure flaps inwardly over the top.

8. Apparatus according to claim 3, comprising means at the far side of the mandrel with respect to movement of the carton support relative thereto comprising folding rails for folding the front and back closure flaps outwardly, reciprocal sealing jaws for sealing the top of the bag above the top of the carton, said sealing jaws carrying means for folding the end closure flaps outwardly, a folding rail for folding the seal at the top of the bag over into the carton and means for thereafter folding the closure flaps into engagement over the top of the carton.

9. Apparatus according to claim 8, comprising means for applying adhesive to the outer side of the back closure flap before it is closed inwardly.

10. Apparatus for forming, filling and inserting filled bags into cartons comprising, a hollow vertically disposed forming mandrel, means for forming sheet material into a tube on the mandrel and moving it downwardly thereon in tubular form from the lower end of the mandrel, said lower end of the mandrel corresponding substantially in cross section to the inside cross section of the carton within which the bag is to be inserted, means for moving the carton support to advance cartons in succession below the mandrel, means at the lower end of the mandrel for at times forming a seal transversely of the tube to form a bag length above the seal closed at its bottom and open at its top for receiving the material to be packaged, means for severing the bag during the formation of the seal, means for releasing the closed bottom of the bag for movement downwardly toward the top of a carton on the support and means situated between the sealing means and the carton having a hollow cross section corresponding substantially to the cross section of the carton through which the filled bag is guided into the open end of the carton.

11. Apparatus for forming, filling and inserting filled bags into containers, comprising a hollow vertically disposed forming mandrel, means for forming sheet material into a tube on the mandrel and moving it downwardly thereon over the end, said mandrel having at its lower end a cross section which corresponds substantially to that of the inside cross section of the carton into which the bag is to be inserted, means for at time forming seals transversely of the tube to form a bag length above the seal and a bag length below the seal comprising sealing jaws having opposed faces between which the sides of the tube are pressed to form a seal and upwardly facing flat surfaces for supporting the bottom of the bag at opposite sides of the seal during filling, means for maintaining the seal means in sealing relation to the tube for a predetermined time sufficient to effect consummation of the seal, means for supplying material through the mandrel to completely fill the bag length above the seal during said predetermined time, means for moving the carton support to position the carton below the mandrel, means for severing the tube transversely to separate the bag above the sealing means from the bag below the sealing means, comprising cutting blades which sever the tube within the boundaries of the sealed area, means for releasing the sealing means following said predetermined time and means for guiding the severed bag below the sealing means downwardly into the carton.

12. Apparatus according to claim 11, wherein the cutting blades are designed to cut through the tube below the lower boundary of the sealed area.

13. Apparatus for forming, filling and inserting filled bags into cartons comprising a hollow vertically disposed forming mandrel and therebelow successively sealing means and a carton support, means for forming sheet material into a tube on the mandrel and moving it downwardly thereon, said mandrel having a lower end corresponding substantially in cross section to the inside cross secction of the carton, means for at times sealing the tube transversely and releasing it to form a bag length above the seal and a bag length below the seal, said means being operable to maintain the seal for a predetermined length of time such as to consummate the seal, means for supplying material through the mandrel completely fill the bag length above the seal during said predetermined time, opposed channel-shaped guide members situated between the sealing means and the top of the carton resting on the support which collectively define a vertical passage corresponding in cross section to the inside of the carton through which the filled bag is caused to descend into the carton, means on the guide members for engagement with the top of the carton resting on the support to hold the top of the carton in registration with the guide members during deposit of the bag and means for raising and lowering the guide members following each deposit of the bags to permit a filled carton to be removed and an empty carton to be positioned for insertion of a bag.

14. Apparatus for forming, filling and inserting filled bags into cartons, comprising a hollow vertically disposed forming mandrel, means for forming sheet material into a tube on the mandrel and moving it downwardly thereon in tubular form from the lower end of the mandrel, means for moving empty cartons to a position below the mandrel and from thence away from the lower end of the mandrel, means for at times sealing the tubes transversely to form a bag length, extending from the mandrel down to the sealing means, adapted to be completely filled through the mandrel and for simultaneously severing the tube transversely below the seal to separate the bag above the sealing means from the bag below the sealing means, means for releasing the filled bag from the succeeding bag so that it moves downwardly towards the carton support, means situated below the sealing means for constraining the sides of the completely filled bag to a cross section corresponding to that of the mandrel as it moves downwardly into the carton said means extending from the sealing means to the open top of the carton so that the filled bag is constrained throughout its movement from the lower end of the mandrel into the open top of the carton, means supported above the carton support at the level of the tops of the cartons and in the direction of movement of the carton support for sealing the tops of the bags while in the cartons and means for then closing the end and side closure flaps of the cartons.

* * * * *